United States Patent [19]

Klug

[11] 3,905,923
[45] Sept. 16, 1975

[54] POLY (UREA-URETHANE) FOAMS CONTAINING IMMOBILIZED ACTIVE ENZYMES

[75] Inventor: James H. Klug, Maplewood, Minn.

[73] Assignee: Minnesota Mining and Manufacturing Company, St. Paul, Minn.

[22] Filed: Apr. 4, 1974

[21] Appl. No.: 457,834

[52] U.S. Cl. ...... 260/2.5 AD; 161/190; 260/2.5 AK; 260/2.5 BD
[51] Int. Cl.² .......................................... C08G 18/48
[58] Field of Search ...... 260/2.5 AD, 2.5 A, 2.5 BD

[56] References Cited
UNITED STATES PATENTS
3,672,955 6/1972 Stanley ............................... 195/63
3,781,231 12/1973 Janssen et al. ................ 260/2.5 AD
3,804,699 4/1974 Johnson .............................. 161/190

*Primary Examiner*—M. J. Welsh
*Attorney, Agent, or Firm*—Alexander, Sell, Steldt & DeLaHunt

[57] ABSTRACT

An active, immobilized enzyme system is formed from an enzyme and a hydrophilic poly (urea-urethane) foam, said foam surrounding, entrapping and supporting the enzyme in an active configuration. The hydrophilic foam is formed by the reaction of water with a hydrophilic isocyanate-terminated polyoxyalkylene prepolymer containing at least 50 mole percent of oxyethylene in the prepolymer backbone.

6 Claims, No Drawings

POLY (UREA-URETHANE) FOAMS CONTAINING IMMOBILIZED ACTIVE ENZYMES

BACKGROUND OF THE INVENTION

In one aspect, this invention relates to enzymes useful for catalyzing reactions. In another aspect, this invention relates to a process for immobilizing such enzymes to retain the catalytic activity during storage and to allow separation of the enzyme from the formed product during use. In yet a further aspect, this invention relates to immobilized enzymes.

Enzymes are macromolecules, which for the most part, are composed of covalently bonded amino acid residues and contain in many instances additional free functional groups, such as amino, carboxyl, thiol, hydroxyl, etc., in the bonded amino acid sequence. Enzymes show remarkably efficient catalytic activity, but their ability to function over extended periods of time and over a wide range of chemical and physical parameters is limited by their very nature. Enzyme molecules must retain particular geometric configurations in order to exhibit catalytic activity. Enzymes also normally require an aqueous reaction medium which is held within narrow pH ranges for optimum performance of the enzyme. Also necessary for optimum performance of enzymes are proper operating temperatures and the absence of inhibitors which can limit or can destroy the enzyme's catalytic activity. When the operating parameters are not optimized for a specific enzyme, the enzyme's catalytic efficiency may drop sharply and under some circumstances, this catalytic efficiency can fall to zero when the geometric configuration of the enzyme is altered. The geometric configuration of the enzyme may be altered to the point that it cannot be regenerated even by reoptimizing the process variables.

Soluble enzymes used in homogenous aqueous solutions are in general dificult to separate and recover for recycling from the products of enzyme-catalyzed reactions. In addition, many enzymes are relatively expensive catalytic agents. This expense coupled with product/enzyme separation problems has made the usage of soluble enzymes uneconomical and noncompetitive in many commercial chemical reaction systems.

Immobilized enzymes have been developed in an attempt to circumvent the shortcomings inherent in using enzymes soluble in aqueous solutions.

An immobilized enzyme is, in essence, a free, soluble enzyme which has been encapsulated by, adsorbed an, entrapped in, crosslinked to and/or chemically bonded to various organic or inorganic carriers.

The carrier chosen may be soluble or insoluble in a variety of solvents, both aqueous and nonaqueous, depending upon the end use of the immobilized enzyme.

Immobilized enzymes may exhibit different and desirable characteristics from their soluble counterparts. An immobilized enzyme may show increased thermal and pH stability due to being intimately associated with the carrier matrix which provides a protective barrier to sudden thermal and pH changes which may limit or destroy the catalytic efficiency of the enzyme. Being intimately associated with a carrier, the immobilized enzyme is often more easily separated from the products of an enzyme-catalyzed reaction thereby lowering the effective cost of the enzyme, since the enzyme possibly may be recovered and reused.

Immobilized enzymes have heretofore been formed by encapsulating, adsorbing, chemisorbing, entrapping, chemically bonding or crosslinking the enzymes in or on a variety of supports including collagen, polyacrylamide/gels, reactive copolymers, e.g. copoly (ethylenemaleic anhydride) or copoly (styrene-maleic anhydride), cellulose, nitrocellulose, silastic resins, cellophane, silica, carbon, nylon microcapsules, inorganic media, e.g. glass beads, activated clay and alumina as well as other salts and anionic exchange resins, etc. (see *Immobilized Enzymes* edited by Oskar Zaborsky, CRC Press, 1973, Cleveland, Ohio).

U.S. Pat. No. 3,556,945 describes enzymes stabilized by coupling the enzymes to an inorganic carrier containing reactive silanol groups, the bonded enzyme becoming insoluble in water solutions.

U.S. Pat. No. 3,672,955 discloses a method for forming an immobilized enzyme where an aqueous enzyme solution is emulsified in an inert, water immiscible solvent containing polyisocyanate. The isocyanate reacts with the enzyme to give an immobilized enzyme. This method calls for the enzyme solution to be emulsified such as by the use of a high shear mixer.

The prior art immobilized enzymes have certain associated apparent problems inherent in the type of stabilization or immobilization employed. The majority of immobilization procedures require several hours to several days to satisfactorily complete immobilization of the enzyme. Most procedures also require exacting manipulations during the process by trained personnel in order to produce an immobolized enzyme which remains catalytically active, and such procedures are expensive and difficult to carry out over extended reaction times.

In those cases where covalent bonding is used to immobilize the enzyme, there is a risk of substantially or completely destroying the catalytic efficiency of the enzyme if the enzyme is covalently bonded to the carrier at or near the active site of the enzyme. In addition, covalently bonded enzyme molecules are normally bound to the carrier only at various distal points along the length of the enzyme chain and when placed in an aqueous solution the enzyme molecules can unfold, or change their geometric configuration, thereby reducing or destroying the enzyme's catalytic activity. Another disadvantage in the immobilization of enzymes by covalent bond formation with a carrier material is that relatively pure enzymes are required. The use of unpurified enzymes maximizes the probability that a major portion of the reactive functional groups of the carrier may react with the impurities in the crude enzyme preparation thereby inadequately or improperly bonding the desired enzyme molecules to the carrier.

The heretofore available immobilized enzyme materials are normally formulated as insoluble fine powders, granules, flakes or beads, etc. When employed in a chemical reaction, these immobilized enzyme materials must be constrained in a column, bag or other apparatus so as to prevent mechanical or handling loss of the immobilized enzyme materials. This severely limits ultimate reactor design and flexibility when employing these immobilized enzyme materials.

An additional problem in the prior art is associated with the immobilizing reaction of enzymes with hydrophobic carrier materials. Aqueous solutions of enzymes do not easily mix and subsequently react with nonaqueus solutions of a hydrophobic carrier to form homogeneous preimmobilized enzyme-carrier mixtures. Therefore, in some immobilization procedures it is a common expedient to lace or beat a mixture of an aqueous enzyme solution and a coreactant carrier material solution in a high shear mechanical device, e.g. a blender. The exposure of an aqueous enzyme solution to the high shear forces present in the blending operation increases the probability of shear denaturization of the fragile enzyme molecules with a consequent loss of enzymatic activity in the final immobilized enzyme material; such problems are well known in the art.

BRIEF SUMMARY OF THE INVENTION

Briefly, this invention comprises a hydrophilic polymeric foam containing an enzyme in which the enzyme is immobilized by entrapment in a hydrophilic poly(urea-urethane)-foam matrix. The process by which the novel enzyme hydrophilic foam is made involves the reaction of an isocyanate-terminated urethane prepolymer, said prepolymer being an isocyanate-terminated polyoxyalkylene glycol containing at least 50 mole percent oxyethylene in said glycol, with an aqueous solution containing enzymatic material. The resulting enzyme-hydrophilic foams forms a catalytic agent which is especially compatible with aqueous substrate mixtures.

In the enxyme-foam compositions of this invention, the polymeric foam immobilizes the enzyme and retards leaching of the enzyme from the foam material while simultaneously containing and supporting the enzyme in an active configuration, thereby maintaining a high degree of catalytic activity. The enzyme-hydrophilic foam material is easily recovered from reaction media thereby allowing recycling of the enzyme. In addition, the hydrophilic foam is self-supporting and flexible, providing broad latitude in reactor design.

The enxyme-form material of this invention can be used in chemical reactor systems in place of the heretofore available immobilized enzymes wherever the solution being treated is sufficiently fluid to pass into the foam and contact the entrapped enzyme.

DESCRIPTION OF THE PREFERRED EMBODIMENTS

A wide variety of enzymes are capable of being immobilized in the poly(urea-urethane) foam carrier of this invention, including papain, amyloglucosidase, beta-glucosidase, betagalactosidase, carboxypeptidases A and B, rennin, thrombin, ficin, pepsin, trypsin, chymotrypsin, keratinase, subtilopeptidase, streptokinase, bromelain, kallikrein, pronase, asparaginase, urease, amylase, maltase, aldolase, penicillin-amidase, amino acylases, lysine decarboxylase, hydroxylnitrile lyase, lipase, cholinesterase, carbonic anhydrase, enolase, glucose oxidase, galactose oxidase, catalase, alcohol dehydrogenase, lactate dehydrogenase, aldolase, glyceraldehydephosphate dehydrogenase, tyrosinase, pyruvate kinase, phosphoglucomutase, ribonuclease, alkaline phosphatase, acid phosphatase, alpha-amylase, beta-amylase, peroxidase and hexokinase.

Starting enzymes useful in making of the enzyme-hydrophilic foam of this invention need not be purified substances but may be a more or less crude preparation containing an enzyme or a plurality of enzymes. Thus, for example, one may employ microbiological preparations which contain enzymes, e.g. yeast cultures, molds, bacteria and the like. Other suitable use enzyme containing preparations such as animal organs, soil, mucous, tumors, etc. can also be incorporated in the hydrophilic foam material.

It is also within the scope of this invention to incorporate various fillers in the foam. The incorporation of fillers can be done to reduce the cost, increase the mechanical strength of the foam and otherwise alter the properties of the foam in a desirable manner. Suitable fillers include cellulose fibers, wood chips and fibers, synthetic fibers, natural and/or synthetic polymers, nonwoven web, woven mats and scrims, cotton, wool, glass particles, polymeric films, metal screen or rods, metal particles, paper, cork, rubber as well as other materials which will not interfere with the catalytic activity of the entrapped enzyme.

To form the enzyme-hydrophilic foam structure of this invention, enzyme-containing materials is first dispersed in a large amount of water, about 0.15 to 15 parts by weight of the enzyme-containing material per 100 parts water usually being sufficient. The amount of water present is at least several times that necessary to convert all the isocyanate present into urea links. The resulting aqueous mixture, which may be a suspension or solution, is then reacted with the isocyanate-terminated prepolymers disclosed hereinafter, most of the prepolymer reacting with the water present to form the enzyme-hydrophilic foam of this invention. Much of the excess water present will be trapped in the foam.

Generally, the isocyanate-terminated prepolymers used in the practice of this invention are the reaction product of a polyoxyalkylene polyol and a polyisocyanate. The OH equivalent weight of the polyoxyalkylene polyols used in this invention should range from about 300 to 4000 and have at least 50 mole percent oxyethylene in order to provide a prepolymer with good hydrophilicity. Particularly good results are obtained with polyol precursors having an OH equivalent weight which is somewhat greater than 400, e.g. 450 up to 1200. A particularly suitable commercially available series of polyoxyethylene glycols is available from Union Carbide Corporation under the trade name "Carbowax". Other classes of materials useful in making prepolymers for the practice of this invention include polyoxyethylene diamines with equivalent weights of about 1000 as well as polyoxyethylene dimercaptans and the like.

The polyoxyalkylene chains of the prepolymers used in this invention preferably contain mostly or entirely oxyethylene units (e.g. greater than 80 mole percent) but copolymers, terpolymers, etc. containing a minor amount of oxypropylene, oxy-1-2-butylene or oxy-1-4-butylene units are not detrimental and may provide desirable foam properties, e.g. increasing the flexibility of the cured polymeric foam. The copolymers can be random or block copolymers, as is well known in the art. It is thus useful for the purpose of the invention to employ random or block copolymer oxyalkylene chains in which a majority (greater than 50 mole percent) of the repeating units are oxyethylene. Likewise, simple mixtures of polyoxyethylene polyols with other polyols to make the prepolymers of this invention, and mixtures of oxyethylene containing prepolymers can be used, provided that the total oxyethylene units in the cured polymer will always be at least 50 mole percent. These various mixtures and copolymers can be selected with a view toward varying the amount of hydrophilicity, flexibility and stretchability or conformability of the cured foam.

One class of the polyol water-miscible block copolymers can be represented by the formula: $Y_1-[(RO)-H]_z$ where $Y_1$ is an active hydrogen-free residue of the precursor used to foam the polyol, $z$ is an integer equal to the hydroxy functionality of the polyol precursor $Y_1$, and (RO) is a polyoxyalkylene chain having sufficient amount of oxyethylene in said chain to confer hydrophilicity or water-miscibility. A more specific class of copolymers can be represented by the formula:

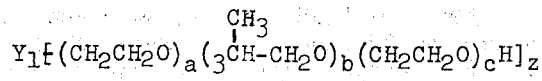

where $Y_1$ and $z$ are the same as defined hereinbefore, and $a$, $b$, $c$ are integers such that the ratio of $(a+c)/b$ is greater than 1. The isocyanate-terminated prepolymers formed by the reaction of isocyanate with said polyols are hydrophilic and water-miscible or water-swellable and generally have an average calculated molecule weight of about 700–8500. The term "active hydrogen" is to be understood as defined according to the well-known Zerewitinoff test, JACS V. 49, p. 3181 (1927).

The isocyanate components of the prepolymers of this invention are derived from an aliphatic, aromatic or aralkyl polyisocyanate, preferably a diisocyanate such as tolylene diisocyanate (TDI), xylene diisocyanate (XDI), napthalene diisocyanate, 4,4'-diphenylmethane diisocyanate (MDI), phenylene diisocyanate, "PAPI", etc. Suitable isomers of these diisocyanates can also be used or mixtures thereof, e.g. 2,4–2,6-TDI, 1,5-napthalene diisocyanate, n-phenylene diisocyanate, as well as those diisocyanates listed in Polyurethanes: Chemistry and Technology by Saunders & Frisch, Part I, Interscience Publishers, New York (1962), p. 348, and Encyclopedia of Chemical Technology by Kirk and Othmer, Second Ed., Vol. 12, pp. 46, 47, Interscience Publishers, New York (1967).

The prepolymers used in this invention are generally mixed with a solvent prior to reaction. The prepolymers are soluble in a variety of organic solvents, but preferably water-miscible solvents such as acetone, tetrahydrofuran, dioxane, or less preferably, dimethylformamide and dimethyl-acetamide are used in the process of this invention to provide significant advantages. Solvents with little or no water-miscibility are much less preferred because water-immiscible prepolymer solutions of an isocyanate-terminated prepolymer do not mix well with an aqueous solution of an enzyme to be immobilized. Acetone is particularly suitable and a preferred solvent for use in the process of this invention because its water-miscibility offers excellent mixing properties; its high volatility also permits easy solvent removal during or after the subsequent curing of the reaction mixture to the poly (urea-urethane) foam.

To form the enzyme-foam used in this invention, the aqueous solution or dispersion of enzyme is mixed with the above-described isocyanate-terminated prepolymer or prepolymer solution and any inert materials which are be be entrapped or contained in the finished product. The combined enzyme and prepolymer solutions are gently stirred or agitated to insure a thorough mixing of the two solutions and the resulting mixture is allowed to cure for several minutes. The reaction of the isocyanate moiety of the prepolymers with the water present forms a poly (urea-urethane) and results in the evolution of carbon dioxide and the formation of a partially open-celled, partially closed-cell foam which surrounds, entraps and supports the enzyme material.

Surfactants can also be added to facilitate the formation of the desired cellular structure. Particularly preferred nonionic surfactants are those which represent a complex mixture of polyoxyethylene derivatives of sorbitan fatty acid esters such as those sold under the trade name "Tween". The surfactant chosen can be conveniently added to the prepolymer solution prior to mixing with the enzyme solution.

The isocyanate-water reaction is conveniently carried out at temperatures from about 0° to 70°C., but in any case within a temperature range which will not deleteriously affect the catalytic properties of the enzyme being entrapped. A particularly preferred range of reaction temperatures is about 0° to 3°C., reaction mixtures at these temperatures having a longer reaction time and allowing slower and more thorough mixing. It is important, however, to keep the temperature of the reaction mixture above 0°C. since freezing enzymes sometimes tend to reduce or destroy their catalytic activity.

The reaction mixture will cure to an immobilized enzyme-poly (urea-urethane) foam in about 30 seconds to 10 minutes, the longer reaction times being associated with the lower reaction temperatures, and vice versa.

The resulting cured immobilized enzyme-poly (urea-urethane) foam is hydrophilic, contains much of the excess water originally present and has a tendency to retain water during storage. The hydrophilic nature of the foam allows aqueous solutions of substrates, the material acted upon by the enzyme, to enter the foam easily, providing an excellent milieu for the enzyme catalyzed reaction.

The following nonlimiting examples illustrate the preferred practices of this invention. All parts and percentages in the examples are be weight, unless otherwise specified.

EXAMPLE 1

An aqueous enzyme solution was formed by adding 1.5 grams papain (available commercially as papain No. P-3375, crude powder Type 2) to 40 milliliters of distilled ice water and the aqueous solution stirred with magnetic stirring bar until the enzyme was substantially dissolved.

An isocyanate-terminated prepolymer solution was formed by reacting stoichiometric amounts of 80:20, 2,4-2,6-tolylene diisocyanate and a 1000 molecular weight polyoxyethylene polyol (available under the trade name "Carbowax" 1000) at about 135°C. for about 5 hours using a 2-ethylhexanoic acid and tin octoate catalyst and diluting the resulting isocyanate-terminated urethane prepolymer to 90 percent solids with acetone.

To 24.5 grams of the acetone solution of isocyanate-terminated prepolymer was added 0.22 grams of "Tween"-80 (a polyoxyethylene derivative of sorbitan fatty acid ester having a molecular weight of about 1309) and the viscous mixture stirred by hand for approximately 30 seconds. Twenty milliliters of the aqueous enzyme solution was added to the prepolymer solution and the resulting pasty mixture stirred to homogeneity. The remaining cold aqueous enzyme solution was then added and the reaction mixture again stirred to homogeneity. The reacting mass was then poured into an aluminum pan approximately 16 cm. × 24 cm. in size. The reaction mixture was allowed to stand at ambient temperature for approximately 5 minutes at which time the reaction was essentially complete. The resulting white, spongy, wet, semi-rigid, enzyme-polymer foam was 0.4–1.0 cm. thick. The foam was removed from the reaction pan and stored in a refrigerator at a temperature of 0° to 5°C., the foam remaining damp during storage.

The papain-foam structure was subsequently tested for papain biological activity. A papain activator solution was prepared by mixing 11.6 grams of sodium chloride, 0.33 grams of disodium EDTA and 0.96 grams L-cystein hydrochloride and diluting the mixture to 1000 ml. with distilled water. Thirty milliliters of the activator solution and 7 ml. of distilled water were placed in a 50 ml. beaker maintained at 40°C. and the pH adjusted to 6.0 with 0.1 N-sodium hydroxide. A piece of the papain-hydrophilic foam approximately 2.5 cm. by 7.5 cm. by 5 mm. thick was placed in the activator solution. The papain-foam strip contained the equivalent of 78.1 mg. of papain. To the solution was added 0.2 ml. of 0.1 N—HCl and the solution readjusted to a pH of 6.0 with 0.1 N—sodium hydroxide.

To the above mixture a solution containing 72.3 mg. of α-N-benzoyl-L-arginine ethyl ester hydrochloride (hereinafter BAEE) in 5 ml. of distilled water was added in two approximately equal portions.

The ensuing enzymatic hydrolysis was followed titrimetrically by adding sodium hydroxide to keep the solution at pH 6.00. The maximum rate of hydrolysis of BAEE was experimentally determined to be $3.95 \times 10^{116\ 2}$ micromoles BAEE hydrolyzed per minute per mg. crude papain powder. The maximum activity of a similar papain-foam strip tested 77 days after preparation was $2.09 \times 10^{116\ 2}$ micromoles BAEE hydrolyzed per minute per mg. crude papain powder. Thus, approximately 53 percent of the original biological activity had been retained.

EXAMPLE 2

A solution of 2 grams of urease (urease, No. U–1500, type III, available from Sigma Chemical Co.) in 40 ml. ice water was reacted with 24.5 grams of the prepolymer solution of Example 1. As in Example 1, a white, spongy, wet, semi-rigid foam material was formed. The resulting foam was stored in a refrigerator at 0°to 5°C. in a damp condition.

After storage, the resulting enzyme-foam material was assayed for enzyme activity. In a beaker, 10 mg. of disodium ethylene diamine tetraacetic acid was mixed with 30 ml. of distilled water. The solution was maintained at 30°C. and the pH adjusted to 7.00 by the addition of 0.1 N—HCl.

A piece of the urease-foam approximately 2.5 cm. by 7.5 cm. by 5 mm. containing the equivalent of 120.6 mg. urease was added to the beaker. The pH was again adjusted to 7.00 by the addition of 0.1 normal HCl and a solution containing 10 mg. of urea in 5.0 ml. of distilled water was added by syringe in two approximately equal portions. The ensuing enzymatic degradation of urea was followed titrimetrically to completion. The maximum rate of enzymatic degradation of urea was experimentally determined to be $16.6 \times 10^{116\ 2}$ micromoles urea degraded/ minute/mg. urease in the hydrophilic polymer matrix.

EXAMPLE 3

A solution containing 4 ml. of a glucose oxidase and catalase mixture (available commercially as "DeeO" from Miles Laboratories, Inc.), in 40 ml. of ice water was allowed to react with 24.5 grams of the isocyanate-terminated prepolymer solution of Example 1. A white, spongy-wet, semi-rigid enzyme-foam matrix was formed as in the preceeding examples.

A pink, basic solution of glucose containing phenolphthalein, a visual indicator, was passed through a glass tube containing pieces of the glucose oxidase-catalase foam. The pink glucose solution turned colorless upon coming into contact with the immobilized enzyme system indicating the production of an acid by the enzyme and consequent change in the basicity of the solution.

EXAMPLE 4

To make a reinforced enzyme-foam material, two strips of nonwoven nylon-urethane web approximately 16 cm. wide by 24 cm. long by 5 mm. thick weighing a total of 3.1 grams were cut from a larger web formed from randomly woven nylon-urethane fibers. A reaction mixture of papain and prepolymer corresponding to the reaction mixture of Example 1 was mixed and allowed to react for 30 seconds. The resulting mixture was then poured over one strip of the nylon-urethane web in a receptacle. The second strip of nylon-urethane web was quickly pressed on top of the reacting foaming mixture and the foaming, cream-like polymer-enzyme solution quickly spread and foamed throughout the top layer. The matrix was allowed to fully cure and after approximately 5 minutes a tough, spongy, resilient enzyme-polymer foam reinforced with a nylon-urethane nonwoven web was formed.

A strip of the reinforced enzyme-foam material was assayed in the same fashion as described in Example 1 for the papain matrix. The miximum rate of hydrolysis of BAEE using a one-day-old strip with an equivalent of 90 mg. papain was experimentally determined to be $4.45 \times 10^{116\ 2}$ micromoles BAEE hydrolized per minute per mg. of immobilized papain.

EXAMPLE 5

The procedure of Example 4 was repeated substituting the urease reaction mixture of Example 2. The immobilized enzyme strip with the reinforcing nylon-urethane nonwoven web was assayed for urease activity in the same manner as described in Example 3. The rate of enzymatic degradation of urea by a representative sample of immobilized urease in this example was $9.34 \times 10^{116\ 2}$ micromoles of urea degraded per minute per mg. urease powder.

Thus, it is possible to form an immobilized enzyme-urethane foam material with a filler such as a nonwoven web in order to form a web which has the flexible, open, resilient characteristics of the enzyme-foam material and, at the same time, has the additional toughness and tear-resistance furnished by a nonwoven web reinforcement.

What is claimed is:

1. An enzyme-containing foam comprising: about 0.1 to 15 percent by weight of an active enzyme preparation on an anhydrous solids basis, and a hydrophilic poly(urea-urethane) foam matrix having an oxyalkylene backbone containing at least 50 mole percent oxyethylene; said hydrophilic foam being formed by reacting an isocyanate-terminated prepolymer containing an aqueous solution of said enzyme with water, and said hydrophilic foam entrapping and supporting said enzyme in an active configuration for enzymatic activity.

2. A process for forming an active enzyme foam comprising the steps of:

combining an aqueous solution of enzyme and a hydrophilic isocyanate-terminated polyoxyalkylene prepolymer, said prepolymer containing at least 50 mole percent oxyethylene units; and reacting the enzyme-containing isocyanate-terminated prepolymer with water to form a foam containing said enzyme in an active configuration.

3. The process according to claim 2, wherein said reaction is carried out at 0° to 3°C.

4. The enzyme foam of claim 1 containing from 1 to 50 percent by weight of filler.

5. The process according to claim 2 where said isocyanate-terminated prepolymer has a molecular weight from about 700 to 8500.

6. The enzyme foam of claim 1 containing a nonwoven reinforcing web.

* * * * *

UNITED STATES PATENT AND TRADEMARK OFFICE
CERTIFICATE OF CORRECTION

PATENT NO. : 3,905,923
DATED : September 16, 1975
INVENTOR(S) : James H. Klug

It is certified that error appears in the above-identified patent and that said Letters Patent are hereby corrected as shown below:

Column 5, line 4, "$Y_1-(-$" should read --$Y_1 \vdash ($-- .

Column 7, line 35, "$10^{116}\ 2$" should read --$10^{-2}$-- .

Column 7, line 39, "$10^{116}\ 2$" should read --$10^{-2}$-- .

Column 7, last line, "$10^{116}\ 2$" should read --$10^{-2}$-- .

Column 8, line 44, "$10^{116}\ 2$" should read --$10^{-2}$-- .

Column 8, line 55, "$10^{116}\ 2$" should read --$10^{-2}$-- .

Signed and Sealed this sixteenth Day of December 1975

[SEAL]

Attest:

RUTH C. MASON
*Attesting Officer*

C. MARSHALL DANN
*Commissioner of Patents and Trademarks*

Notice of Adverse Decision in Interference

In Interference No. 99,716, involving Patent No. 3,905,923, J. H. Klug, POLY (UREA-URETHANE) FORMS CONTAINING IMMOBILIZED ACTIVE ENZYMES, final judgment adverse to the patentee was rendered Feb. 13, 1981, as to claims 1-5.

[*Official Gazette June 2, 1981.*]